United States Patent
Toda

(10) Patent No.: US 9,946,254 B2
(45) Date of Patent: Apr. 17, 2018

(54) ALARM DISPLAY SYSTEM USING NON-CONTACT TYPE IC TAG

(71) Applicant: FANUC CORPORATION, Minamitsuru-gun, Yamanashi (JP)

(72) Inventor: Shuntaro Toda, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 12 days.

(21) Appl. No.: 14/810,929

(22) Filed: Jul. 28, 2015

(65) Prior Publication Data

US 2016/0027288 A1    Jan. 28, 2016

(30) Foreign Application Priority Data

Jul. 28, 2014 (JP) .................................. 2014-153201

(51) Int. Cl.
*G05B 23/02* (2006.01)

(52) U.S. Cl.
CPC .................................. *G05B 23/027* (2013.01)

(58) Field of Classification Search
None
See application file for complete search history.

(56) References Cited

U.S. PATENT DOCUMENTS 4,918,693 A * 4/1990 Ardini, Jr. ............... G06F 11/22
714/25
5,195,173 A * 3/1993 Gordon ................ G06N 99/005
706/11
5,202,726 A * 4/1993 McCulley .............. G03G 15/55
399/11

(Continued)

FOREIGN PATENT DOCUMENTS

CN        1497404 A      5/2004
CN      101438328 A      5/2009

(Continued)

OTHER PUBLICATIONS

Chinese Office Action for Chinese Application No. 201510364957.9, dated Mar. 27, 2017, including English translation, 16 pages.

(Continued)

*Primary Examiner* — Quan-Zhen Wang
*Assistant Examiner* — Chico A Foxx
(74) *Attorney, Agent, or Firm* — RatnerPrestia

(57) ABSTRACT

An alarm display system includes: an IC tag storing ID information for identifying components of a control device; an IC tag reading part capable of reading the ID information stored in the IC tag in a non-contact manner; a storage part storing alarm handling information in association with alarm information for identifying a type of an alarm and the component related to the alarm; a handling information extracting part extracting, when an alarm is generated, alarm handling information related to the component which is identified by the ID information from the alarm handling information corresponding to the alarm based on the alarm information and the ID information read by the IC tag reading part; and a handling information display part displaying the alarm handling information extracted by the handling information extracting part.

12 Claims, 4 Drawing Sheets

(56) References Cited

U.S. PATENT DOCUMENTS

| | | | | |
|---|---|---|---|---|
| 5,581,242 A * | 12/1996 | Arita | | G05B 23/0272 340/404.1 |
| 6,417,760 B1 * | 7/2002 | Mabuchi | | G07C 3/08 235/382 |
| 6,463,550 B1 * | 10/2002 | Cepulis | | G06F 11/006 714/25 |
| 6,829,527 B2 * | 12/2004 | Felke | | G06F 17/30595 701/29.3 |
| 7,054,707 B2 * | 5/2006 | Moriya | | H05K 13/08 250/559.29 |
| 7,471,198 B2 * | 12/2008 | Yamamoto | | F16C 33/4623 235/385 |
| 7,525,430 B2 * | 4/2009 | Nakamura | | F16C 41/008 340/539.24 |
| 7,979,327 B2 * | 7/2011 | Ikeda | | F16C 3/02 340/438 |
| 8,015,271 B2 * | 9/2011 | McKeown | | H04L 12/24 709/223 |
| 8,019,455 B2 * | 9/2011 | Maenishi | | H05K 13/08 29/729 |
| 9,358,685 B2 * | 6/2016 | Meier | | B25J 9/1602 |
| 2003/0042316 A1 * | 3/2003 | Teraura | | G06K 19/0723 235/487 |
| 2004/0061466 A1 * | 4/2004 | Hashimoto | | F16P 3/12 318/445 |
| 2004/0080897 A1 * | 4/2004 | Kodama | | H05K 13/08 361/234 |
| 2004/0172159 A1 * | 9/2004 | Noda | | G05B 19/418 700/225 |
| 2005/0060323 A1 * | 3/2005 | Leung | | G05B 23/0275 |
| 2005/0071032 A1 * | 3/2005 | Urabe | | G05B 19/128 700/109 |
| 2006/0039248 A1 * | 2/2006 | Sasaki | | G11B 15/6835 369/30.27 |
| 2006/0055564 A1 * | 3/2006 | Olsen | | B60R 25/1004 340/994 |
| 2006/0170551 A1 * | 8/2006 | Nakamura | | F16C 41/008 340/572.1 |
| 2006/0289620 A1 * | 12/2006 | Yamamoto | | F16C 33/4623 235/375 |
| 2007/0097542 A1 * | 5/2007 | Goodman | | G11B 15/6835 360/96.4 |
| 2007/0103725 A1 * | 5/2007 | Kawahara | | G06Q 10/06 358/1.15 |
| 2007/0123167 A1 * | 5/2007 | Lauper | | G06F 17/30876 455/41.2 |
| 2007/0200722 A1 * | 8/2007 | Piety | | G05B 19/4065 340/679 |
| 2007/0241908 A1 * | 10/2007 | Coop | | G06Q 10/06 340/572.8 |
| 2007/0242570 A1 * | 10/2007 | Sato | | G06F 11/327 369/30.21 |
| 2008/0096646 A1 * | 4/2008 | Ishida | | G06Q 10/06 463/25 |
| 2008/0255772 A1 * | 10/2008 | Sjostrand | | B25J 9/1674 702/34 |
| 2009/0002164 A1 * | 1/2009 | Brillhart | | H04W 48/02 340/572.1 |
| 2009/0058618 A1 * | 3/2009 | Gopalan | | H04W 8/18 340/10.51 |
| 2009/0160614 A1 * | 6/2009 | Matsumoto | | G06Q 50/22 340/10.1 |
| 2012/0038458 A1 * | 2/2012 | Toepke | | G05B 19/042 340/6.1 |
| 2012/0232961 A1 | 9/2012 | Wellman et al. | | |
| 2014/0012527 A1 * | 1/2014 | Yamamoto | | G07C 3/00 702/82 |
| 2014/0140648 A1 * | 5/2014 | Ito | | G06K 19/0723 384/448 |
| 2014/0206347 A1 | 7/2014 | Shah et al. | | |
| 2015/0100892 A1 * | 4/2015 | Cronin | | G06Q 10/0633 715/747 |
| 2015/0169927 A1 * | 6/2015 | Sun | | G06K 7/10881 235/375 |
| 2015/0186688 A1 * | 7/2015 | Sun | | G06K 7/01 235/375 |
| 2015/0234698 A1 * | 8/2015 | Chan | | G06F 11/0772 714/57 |
| 2015/0310723 A1 * | 10/2015 | Pinkerton | | G08B 21/182 340/870.09 |

FOREIGN PATENT DOCUMENTS

| | | |
|---|---|---|
| JP | H11184517 | 7/1999 |
| JP | 2000132215 | 5/2000 |
| JP | 2004-201481 A | 7/2004 |
| JP | 2011028678 | 2/2011 |
| JP | 2015097048 | 5/2015 |

OTHER PUBLICATIONS

German Office Action with English language translation for Application No. 10 2015 009 434.3, dated Feb. 3, 2017, 17 pages.

Decision to Grant for Japanese Application No. 2014-153201, dated Oct. 18, 2016, 2 pages.

\* cited by examiner

FIG. 3A

ALARM A
[TARGET COMPONENT]
FIRST UNIT
SECOND UNIT
FIRST PRINTED CIRCUIT BOARD
SECOND PRINTED CIRCUIT BOARD
[HANDLING CONTENT]
1. CHECK CONNECTOR OF FIRST PRINTED CIRCUIT BOARD
2. CHECK CONNECTOR OF SECOND PRINTED CIRCUIT BOARD
3. CHECK FUSE OF FIRST UNIT
4. CHECK STATE OF LED OF SECOND UNIT

FIG. 3B

ALARM A
1. CHECK CONNECTOR OF FIRST PRINTED CIRCUIT BOARD
2. CHECK FUSE OF FIRST UNIT

ALARM DISPLAY SYSTEM USING NON-CONTACT TYPE IC TAG

BACKGROUND ART

1. Technical Field

The present invention relates to an alarm display system configured to display an alarm of a control device to control a robot or a numerically controlled machine tool.

2. Description of the Related Art

A control device for controlling a robot or a numerically controlled machine tool includes a variety of components, such as various units, a printed circuit board, a cable and others, depending on the specifications. An operator is required to know what types of components are used in the control device. For example, when the control device detects an abnormality and notifies an alarm, the operator needs to identify the cause of the abnormality and implement a necessary measure. A handling manual generally includes the contents of measures to be implemented for the related component, depending on the type of the alarm. The operator thus needs to know the types of components incorporated into the control device in order to implement the necessary measure in accordance with the handling manual.

An operator has hitherto visually checked the inside of a housing of a control device or the model numbers of the components after taking the components out of the control device. JP2004-201481A discloses a technique in which non-contact type IC tags are attached to the components of the control device and ID information of the components is read out by using a tag receiving means. A known technique using the non-contact type IC tags allows the ID information of the respective components to be acquired easily.

However, the handling manual also includes handling information related to components which are not incorporated in the control device. Therefore, according to the known technique disclosed in JP2004-201481A, it is necessary to search the necessary measures to be actually implemented from large amount of the handling information. This necessitates a considerable amount of time and intensive labor in order to complete the necessary measures in response to the alarm. Therefore, there is a need for an alarm display system which allows an operator to easily check the necessary handling information relating to an alarm in a short period of time in response to the alarm.

SUMMARY OF THE INVENTION

According to a first aspect of the present invention, there is provided an alarm display system configured to display an alarm of a control device for controlling a robot or a numerically controlled machine tool, the alarm display system comprising: an IC tag configured to store ID information for identifying a component of the control device; an IC tag reading part capable of reading the ID information stored in the IC tag in a non-contact manner; a storage part configured to store alarm handling information in association with alarm information for identifying a type of an alarm and with a component relevant to the alarm; a handling information extracting part configured to extract, when the alarm is generated, alarm handling information related to the component identified by the ID information from the alarm handling information corresponding to the alarm being generated, based on the alarm information and the ID information read by the IC tag reading part; and a handling information display part configured to display the alarm handling information extracted by the handling information extracting part.

According to a second aspect of the present invention, in the alarm display system according to the first aspect, the IC tag is attached to at least one of a housing of the control device and the component in the housing.

According to a third aspect of the present invention, in the alarm display system according to the first or second aspect, the component of the control device includes at least one of a control unit, a signal processing unit, a power supply unit, a data storage unit, a display unit, a printed circuit board, a cable and a breaker.

According to a fourth aspect of the present invention, in the alarm display system according to any one of the first to third aspects, the alarm display system further comprises a teach pendant or portable machine operator's panel connected to the control device, the teach pendant or portable machine operator's panel comprising the IC tag reading part.

According to a fifth aspect of the present invention, in the alarm display system according to the fourth aspect, the IC tag reading part is connected to the teach pendant or portable machine operator's panel via a USB connection.

According to a sixth aspect of the present invention, in the alarm display system according to the fourth or fifth aspect, the teach pendant or portable machine operator's panel and the control device are interconnected by a wired or wireless communication system.

According to a seventh aspect of the present invention, in the alarm display system according to any one of the first to sixth aspects, the storage part is configured to store the alarm handling information by a storage device of the control device, a storage device of the teach pendant or portable machine operator's panel connected to the control device, or a detachable external storage device connected to the control device or the teach pendant or portable machine operator's panel, or a storage device of a server capable of communicating with the control device or the teach pendant or portable machine operator's panel.

According to an eighth aspect of the present invention, in the alarm display system according to any one of the first to seventh aspects, the handling information extracting part is configured to extract the alarm handling information by a CPU of the control device, or a CPU of the teach pendant or portable machine operator's panel connected to the control device, or a CPU of a server connected to the control device or the teach pendant or portable machine operator's panel.

According to a ninth aspect of the present invention, in the alarm display system according to the first aspect, the alarm display system further comprises a portable terminal capable of transmitting and receiving data to and from a server, the portable terminal comprising the IC tag reading part.

According to a tenth aspect of the present invention, in the alarm display system according to the ninth aspect, the portable terminal is a mobile phone, a smartphone or a tablet.

According to an eleventh aspect of the present invention, the alarm display system according to any one of the first to tenth aspects further comprises a display device configured to display the ID information read by the IC tag reading part.

According to a twelfth aspect of the present invention, in the alarm display system according to any one of the first to eleventh aspects, the ID information stored in the IC tag contains at least one of a type, a model number, a lot number and a serial number of the component.

According to a thirteenth aspect of the present invention, in the alarm display system according to any one of the first to twelfth aspects, the IC tag is an RF tag.

These and other objects, features and advantages of the present invention will become more apparent in light of the detailed description of exemplary embodiments thereof as illustrated in the drawings.

BRIEF DESCRIPTION OF THE DRAWINGS

FIG. 3A illustrates an example of alarm handling information;

FIG. 3B illustrates an example of the alarm handling information extracted based on components of a control device.

DETAILED DESCRIPTION OF THE INVENTION

Figure 1:
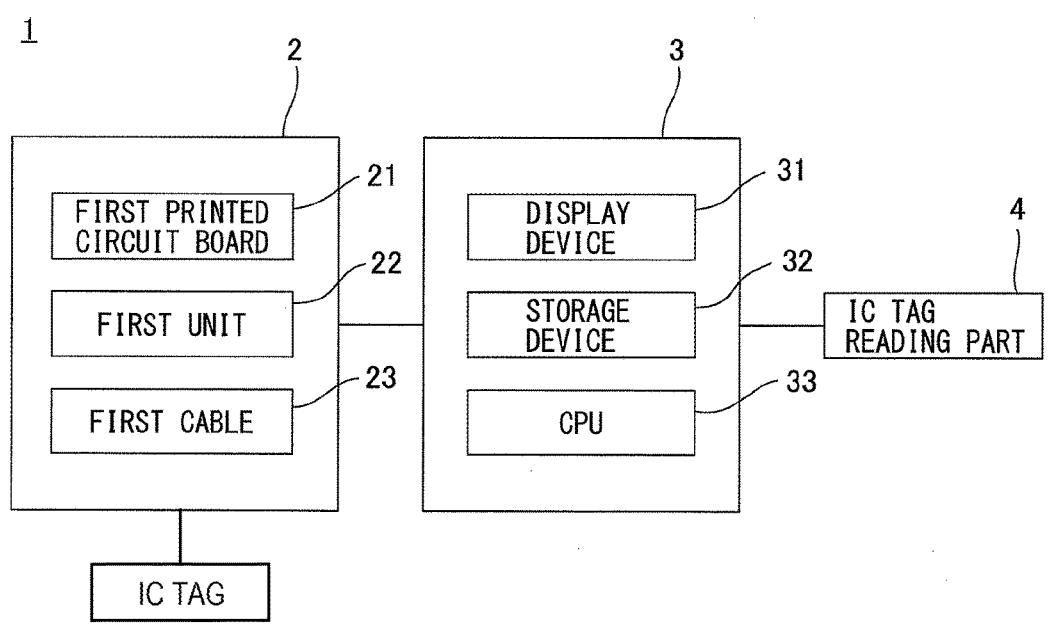
FIG. 1 is a diagram illustrating an exemplary configuration of an alarm display system according to a first embodiment.

Embodiments of the present invention will hereinafter be described with reference to the accompanying drawings. The same or corresponding constituent elements are marked with the same reference numerals.

FIG. 1 illustrates an exemplary configuration of an alarm display system 1 according to a first embodiment. The alarm display system 1 includes a control device 2, a teach pendant or portable machine operator's panel 3 and an IC tag reading part 4. For example, the alarm display system 1 is used for the purpose of notifying an operator of abnormality by displaying an alarm when the abnormality occurs in the control device 2.

The control device 2 is a digital computer used to control, e.g., a robot or a numerically controlled machine tool (not illustrated). The control device 2 has a hardware configuration including a CPU, a storage device and an interface for transmitting and receiving data and signals to and from an external device, each of which is interconnected via a bus. Configurations and functions of the control device 2 and the robot or the numerically controlled machine tool controlled by the control device 2 are not particularly limited in relation to the present invention.

In the illustrative embodiment, the control device 2 includes a first printed circuit board 21, a first unit 22 and a first cable 23 as components thereof. It should be noted that the terms "first", "second" and other equivalent terms are used herein with components for convenience in order to distinguish similar components. The control device 2 may include a variety of components, depending on the specifications, without being limited to the illustrative examples. For example, the components of the control device 2 may also include a variety of units, printed circuit boards, cables and breakers. The term "unit" used herein means a module having a specified function in the control device 2 and includes, e.g., a control unit, a signal processing unit, power supply unit, data storage unit, a display unit and other equivalent units. The "unit" may also mean a minimum unit of a module available in the market.

The teach pendant or portable machine operator's panel 3 is a terminal connected to the control device 2 and used to control the robot or the machine tool. The teach pendant or portable machine operator's panel 3 includes a display device 31 such as a liquid crystal display, a storage device 32 and a CPU 33. The teach pendant or portable machine operator's panel 3 and the control device 2 are interconnected via a known wired or wireless communication system so as to be able to transmit and receive the data and signals to and from each other.

The control device 2 is provided with an IC tag which stores ID information for identifying the components of the control device 2. The IC tag is attached to a housing, e.g., a cabinet, of the control device 2 for housing the components. Alternatively or additionally, the IC tag may be attached to at least one of the components of the control device 2. The IC tag may also be attached to each of the components of the control device 2.

On the other hand, the teach pendant or portable machine operator's panel 3 is connected to an IC tag reading part 4 configured to acquire the ID information stored in the IC tag of the control device 2 in a non-contact manner. The teach pendant or portable machine operator's panel 3 and the IC tag reading part 4 are interconnected via, e.g., a USB cable or an Ethernet (registered trademark) cable. The IC tag reading part 4 is configured to be able to detect the components of the control device 2 by reading out the ID information contained in the IC tag through a known wireless communication technology, e.g., an RFID (Radio Frequency Identification) technology.

In another embodiment, a mobile phone, a smartphone, a tablet and other portable terminals may be used, instead of the teach pendant or portable machine operator's panel 3. Although the embodiment is illustrated in which the IC tag reading part 4 is connected to the teach pendant or portable machine operator's panel 3, the IC tag reading part 4 may be incorporated into the teach pendant or portable machine operator's panel 3.

Figure 2:
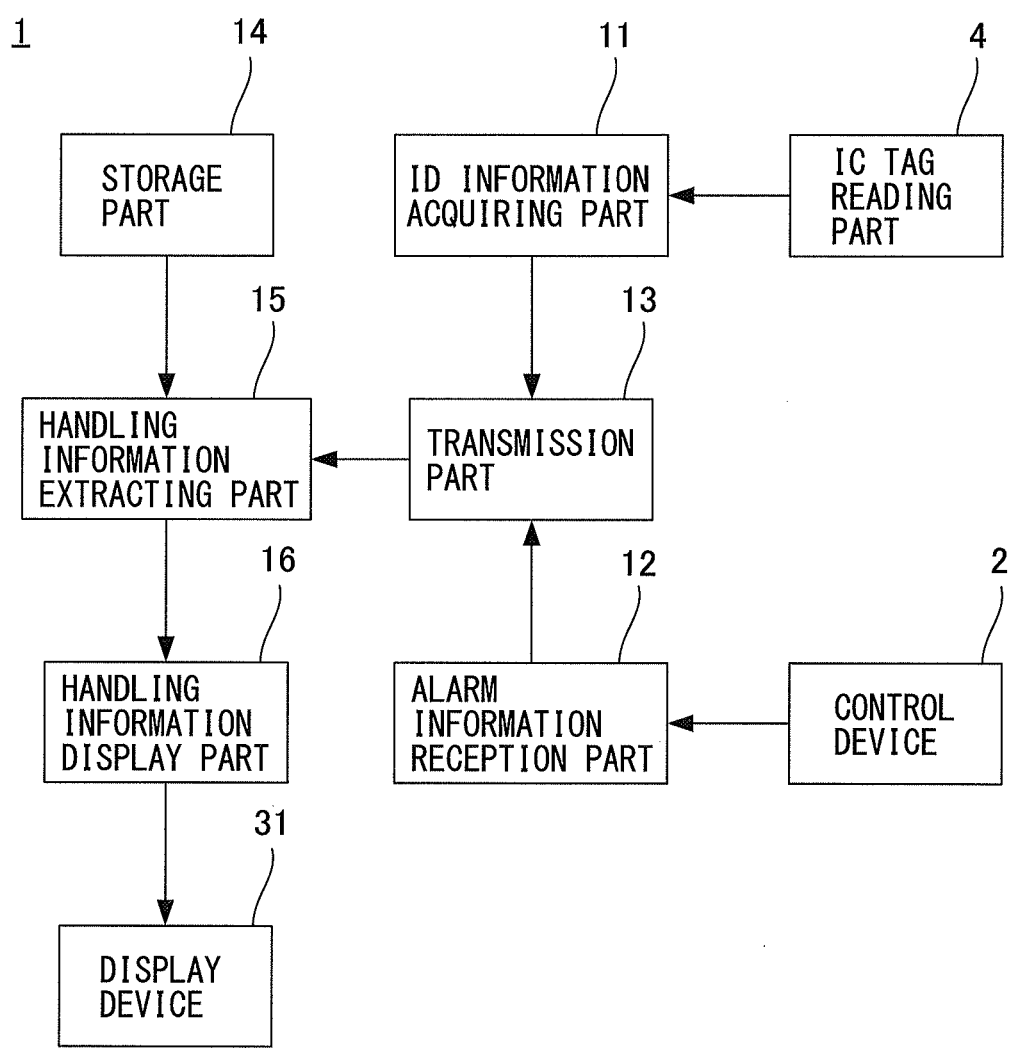
FIG. 2 is a functional block diagram of the alarm display system.

FIG. 2 is a functional block diagram of the alarm display system 1. The alarm display system 1 includes an ID information acquiring part 11, an alarm information reception part 12, a transmission part 13, a storage part 14, a handling information extracting part 15 and a handling information display part 16.

The ID information acquiring part 11 acquires the ID information of the components of the control device 2 from the IC tag attached to the control device 2 by using the IC tag reading part 4. If a plurality of IC tags are used for the control device 2, the IC tags are designed, for example, to operate at different drive frequencies in order to avoid interference with each other. The ID information of the components of the control device 2 acquired by the ID information acquiring part 11 is output to the transmission part 13.

The alarm information reception part 12 receives alarm information from the control device 2 when the control device 2 notifies an alarm upon detecting the abnormality. The alarm information is information for identifying the type of alarm notified by the control device 2 and used to distinguish a plurality types of alarms from each other. The alarm information received by the alarm information reception part 12 is output to the transmission part 13.

The transmission part 13 transmits the ID information and the alarm information to the handling information extracting part 15. The ID information is input from the ID information acquiring part 11 and the alarm information is input from the alarm information reception part 12.

The storage part 14 stores alarm handling information in association with the alarm information and a component(s) related to the alarm identified by the alarm information by using the storage device 32 of the teach pendant or portable machine operator's panel 3. The term "alarm handling information" used herein represents information for specifying a necessary measure to be implemented for the respective components in response to notification of a certain type of alarm (see FIG. 3A).

The handling information extracting part 15 extracts the alarm handling information from the storage part 14 by using the CPU 33 of the teach pendant or portable machine operator's panel 3. The alarm handling information to be extracted corresponds to the ID information and the alarm information transmitted from the transmission part 13. Consequently, the alarm handling information extracted by the handling information extracting part 15 only contains the contents related to the component(s) of the control device 2, which is/are detected by the IC tag reading part 4.

The handling information display part 16 displays the alarm handling information extracted by the handling information extracting part 15 through the display device 31 of the teach pendant or portable machine operator's panel 3.

FIG. 3A illustrates an example of the alarm handling information stored in the storage part 14 (in the case of alarm A). "Target components" show a list of the components related to the alarm A. "Handling contents" show contents of the measures to be implemented for each of the components in response to the alarm A. The storage part 14 also stores the alarm handling information corresponding to other types of alarms in the same manner.

In the embodiment illustrated in FIG. 1, the control device 2 includes the first printed circuit board 21, the first unit 22 and the first cable 23 as the components thereof. In this case, the handling information extracting part 15 extracts, as the alarm handling information, the "handling contents" for the first printed circuit board 21 and the first unit 22 included in the "target components" shown in FIG. 3A.

As a result of the extraction by the handling information extracting part 15, the handling information display part 16 displays "check the connector of the first printed circuit board" and "check the fuse of the first unit," respectively, as the alarm handling information, as shown in FIG. 3B, through the display device 31 of the teach pendant or portable machine operator's panel 3. It should be noted that the "handling contents" for the "second unit" and the "second printed circuit board," which are not the components of the control device 2, are not displayed. The operator checks the states of the first printed circuit board 21 and the first unit 22 in accordance with the alarm handling information displayed on the display device 31.

According to the alarm display system 1 of the present embodiment, the components incorporated into the control device 2 can be easily identified in a non-contact type detection method using the IC tag and the IC tag reading part 4. Further, the alarm display system 1 selectively displays only the alarm handling information for the components incorporated into the control device 2, in accordance with the received alarm information and the detected ID information. Therefore, the operator can immediately recognize the content of the measure to be implemented, and easily complete the measure in response to the alarm in a short period of time.

In the above-described embodiment, the storage part 14 stores the alarm handling information in the storage device 32 incorporated into the teach pendant or portable machine operator's panel 3, which may instead be other types of portable terminal (the same will apply to the case described hereinafter). In another embodiment, however, the storage part 14 may use a storage device incorporated into the control device 2, rather than the storage device 32 of the teach pendant or portable machine operator's panel 3. Alternatively, the storage part 14 may store the alarm handling information in a detachable external storage device connected to the control device 2 or the teach pendant or portable machine operator's panel 3.

In the above-described embodiment, the handling information extracting part 15 uses the CPU 33 incorporated into the teach pendant or portable machine operator's panel 3 to extract the alarm handling information. In another embodiment, however, the handling information extracting part 15 may use a CPU incorporated into the control device 2, rather than the CPU 33 of the teach pendant or portable machine operator's panel 3 (or other types of portable terminal).

The display device 31 of the teach pendant or portable machine operator's panel 3 may be configured to display, in addition to the alarm handling information, the ID information of the components acquired by the ID information acquiring part 11. This allows the operator to easily recognize the components of the control device 2, and facilitates maintenance work.

Figure 4:
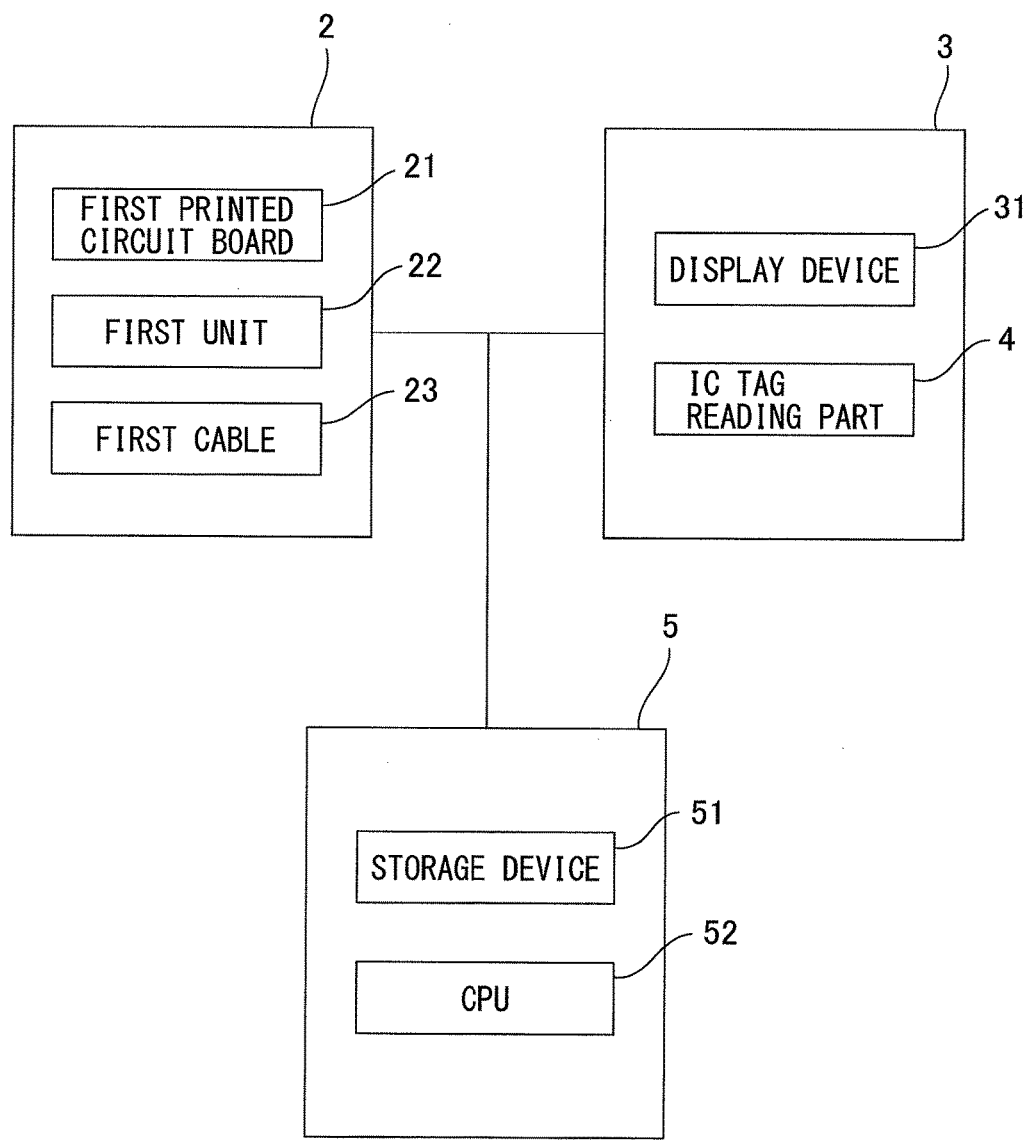
FIG. 4 illustrates an exemplary configuration of an alarm display system according to a second embodiment.

FIG. 4 illustrates an exemplary configuration of an alarm display system 1 according to a second embodiment. The matters described above in relation to the first embodiment may be applied to the second embodiment, as long as there is no contradiction from a technical point of view. Hence, the matters which have already been described above may be omitted in the following explanation.

The alarm display system 1 according to the present embodiment further includes a server 5, in addition to the control device 2 and the teach pendant or portable machine operator's panel 3. The server 5 includes a storage device 51 and a CPU 52. In the present embodiment, the IC tag reading part 4 is incorporated into the teach pendant or portable machine operator's panel 3. However, the IC tag reading part 4 may be detachably connected to the teach pendant or portable machine operator's panel 3.

In the present embodiment, the control device 2, the teach pendant or portable machine operator's panel 3 and the server 5 are interconnected via a wired or wireless network. The control device 2 and the teach pendant or portable machine operator's panel 3 may be interconnected via a dedicated communication cable.

In the illustrated alarm display system 1, the storage part 14 stores the alarm handling information (see FIG. 3A) in the storage device 51 of the server 5. The alarm handling information is stored in association with the alarm information and the relevant components in the same way as in the embodiments described above. The handling information extracting part 15 extracts the alarm handling information for the components incorporated into the control device 2 by the CPU 52 of the server 5.

In this way, the present invention may be configured to store and extract the alarm handling information by the storage device 51 and the CPU 52 of the server 5. According to the present embodiment in which the alarm handling information is stored in the server 5, centralized management of the latest alarm handling information can be realized through the server 5, in addition to the above-described advantages. Accordingly, in the case of a plurality of alarm display systems 1 connected to a common server, the data management can be facilitated.

Effect of the Invention

The alarm display system according to the present invention selectively displays the alarm handling information for the components which are actually incorporated into the control device among the components related to the alarm being notified, based on the information stored in the IC tag and in the storage part. Hence, there is no need to visually check the components of the control device, and the necessary alarm handling information can be promptly acquired. As a result, the necessary measure in response to the alarm can be carried out in the short period of time.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. An alarm display system configured to display an alarm of a computer for controlling a robot or a numerically controlled machine tool, the alarm display system comprising:
   an IC tag configured to store ID information for identifying a component of the computer, wherein the component of the computer includes at least one of a control unit, a signal processing unit, a power supply unit, a data storage unit, a display unit, a printed circuit board, a cable and a breaker;
   an IC tag reading part capable of reading the ID information stored in the IC tag in a non-contact manner;
   a storage part configured to store alarm handling information in association with alarm information for identifying a type of an alarm and with the component of the computer relevant to the alarm;
   a handling information extracting part configured to extract, when the alarm is generated, alarm handling information related to the component identified by the ID information from the alarm handling information corresponding to the alarm being generated, based on the alarm information and the ID information read by the IC tag reading part; and
   a handling information display part configured to display the alarm handling information extracted by the handling information extracting part.

2. The alarm display system according to claim 1, wherein the IC tag is attached to at least one of a housing of the computer and the component in the housing.

3. The alarm display system according to claim 1, wherein the alarm display system further comprises a teach pendant or portable machine operator's panel connected to the computer, the teach pendant or portable machine operator's panel comprising the IC tag reading part.

4. The alarm display system according to claim 3, wherein the IC tag reading part is connected to the teach pendant or portable machine operator's panel via a USB connection.

5. The alarm display system according to claim 3, wherein the teach pendant or portable machine operator's panel and the computer are interconnected by a wired or wireless communication system.

6. The alarm display system according to claim 1, wherein the storage part is configured to store the alarm handling information by a storage device of the computer, a storage device of the teach pendant or portable machine operator's panel connected to the computer, or a detachable external storage device connected to the computer or the teach pendant or portable machine operator's panel, or a storage device of a server capable of communicating with the computer or the teach pendant or portable machine operator's panel.

7. The alarm display system according to claim 1, wherein the handling information extracting part is configured to extract the alarm handling information by a CPU of the computer, or a CPU of the teach pendant or portable machine operator's panel connected to the computer, or a CPU of a server connected to the computer or the teach pendant or portable machine operator's panel.

8. The alarm display system according to claim 1, wherein the alarm display system further comprises a portable terminal capable of transmitting and receiving data to and from a server, the portable terminal comprising the IC tag reading part.

9. The alarm display system according to claim 8, wherein the portable terminal is a mobile phone, a smartphone or a tablet.

10. The alarm display system according to claim 1, further comprising a display device configured to display the ID information read by the IC tag reading part.

11. The alarm display system according to claim 1, wherein the ID information stored in the IC tag contains at least one of a type, a model number, a lot number and a serial number of the component.

12. The alarm display system according to claim 1, wherein the IC tag is an RF tag.

* * * * *